United States Patent [19]

Davies et al.

[11] Patent Number: 5,061,313

[45] Date of Patent: Oct. 29, 1991

[54] DIRECT ALLOY SYNTHESIS FROM HETEROPOLYMETALLIC PRECURSORS

[75] Inventors: Geoffrey Davies, Boston; Hui-Li Shao, Brighton, both of Mass.

[73] Assignee: Northeastern University, Boston, Mass.

[21] Appl. No.: 579,802

[22] Filed: Sep. 7, 1990

[51] Int. Cl.$^5$ .............................................. B22F 9/30
[52] U.S. Cl. ..................................................... 75/362
[58] Field of Search ............................................ 75/362

[56] References Cited

U.S. PATENT DOCUMENTS

| | | | |
|---|---|---|---|
| 3,449,115 | 6/1969 | Galmiche et al. | 75/351 |
| 3,909,247 | 9/1975 | Paris et al. | 75/344 |
| 4,111,686 | 9/1978 | Paris et al. | 75/344 |
| 4,537,624 | 8/1985 | Tenhover et al. | 75/362 |
| 4,537,625 | 8/1985 | Tenhover et al. | 75/351 |
| 4,585,617 | 4/1986 | Tenhover et al. | 419/5 |
| 4,659,373 | 4/1987 | Bogdanovi | 75/362 |
| 4,933,003 | 6/1990 | Marzik et al. | 75/362 |

FOREIGN PATENT DOCUMENTS 816398  7/1959  United Kingdom .

OTHER PUBLICATIONS

"Transmetalation: A New Route to Heteropolymetallic Molecules and Materials", G. Davies et al., ©1989 Gordon & Breach, pp. 203–220.

"Transmetalation Reactions of Tetranuclear Copper (II) Complexes . . . ", A. El-Toukhy et al., J. Amer. Chem. Soc. 1984, 106, pp. 4596–4605.

"Transmetalation of Tetranuclear Copper Complexes. 7. Spectral . . . ", G. Davies et al., Inorg. Chem. 1986, 25, pp. 2269–2271.

"Cu–Ni Alloy Formation by Reduction in Hydrogen of Polyheterometallic Complex", J. Marzik et al., Jour. of Materials Science Letters 7 (1988) pp. 833–835.

"Microaggregates of Non-Noble Metals and Bimetallic Alloys Prepared by Radiation-Induced Reduction", J. L. Marignier et al., Nature 317, pp. 344–345 (1985).

"Determination of the Surface Composition of Copper–Nickel Alloy Powders: A Comparison Between Hydrogen Chemisorption and the Reaction of $N_2O$ Decomposition", Chen et al., Jour. of Catalysis 95, 346–352 (1985).

"Limits of Direct Transmetalation of Polynuclear Copper (II) Complexes with . . . ", A. Abu-Raqabah et al., Inorg. Chem. 1989, 28, pp. 1156–1166.

"On the Low Temperature Synthesis of Alloys by Precipitation Reactions", A. Cheetham et al., Journal of the Less-Common Metals, 116 (1986) pp. 43–50.

"Single-Phase $Cu_{0.50}Ni_{0.50}$ Alloy Preparation by Thermolysis of A . . . ", G. Davies et al., Materials Letters, Apr. 1990, vol. 9, No. 7, 8, pp. 231–234.

*Primary Examiner*—John P. Sheehan
*Attorney, Agent, or Firm*—Weingarten, Schurgin, Gagnebin & Hayes

[57] ABSTRACT

A method for forming a single-phase, homogeneous and high surface area metal alloy by reducing a heteropolymetallic complex in the presence of $H_2$ at a low temperature. Also disclosed is a method for forming a single-phase, homogeneous and high surface area metal alloy by thermolysis of a heteropolymetallic complex in an inert atmosphere at a low temperature.

9 Claims, No Drawings

DIRECT ALLOY SYNTHESIS FROM HETEROPOLYMETALLIC PRECURSORS

STATEMENT OF GOVERNMENT INTEREST

The invention described herein may be manufactured, used and licensed by or for the Government for Governmental purposes without the payment to us of any royalty thereon.

BACKGROUND OF THE INVENTION

The present invention concerns the formation of compositionally and morphologically uniform metal alloys and catalysts at low temperature.

Metal alloys, such as copper-nickel (Cu-Ni), are well established as catalysts for a number of chemical processes. In hydrogenation reactions, alloy composition is known to affect significantly both catalyst activity and selectivity.

Cu-Ni catalysts can be prepared by a number of standard metallurgical and powder metallurgical techniques. Alloy formation in the Cu-Ni system is an endothermic process and alloys tend to exhibit compositional inhomogeneities in the form of local regions of relatively pure copper and pure nickel. A long careful annealing treatment is generally required to reach equilibrium and obtain single-phase homogeneous alloys. Techniques which tend to minimize inhomogeneities with a minimum of processing are therefore of great interest.

In any catalyst, a high surface area is generally desirable and usually leads to high catalyst activity. Low temperature decomposition of inorganic or organometallic precursors is a Potential route to high surface area alloys. Because of the endothermic nature of the Cu-Ni system, formation of single-phase homogeneous alloys may present a problem.

In a study of Cu-Ni alloy formation via the hydrogen reduction of metal carbonate precursors it was reported that fairly homogeneous alloys were obtained, but it was not clear that these were completely single phase. As a further consideration, the reported critical temperature for single-phase Cu-Ni alloy formation is 320° C. Thus, the decomposition temperature of the precursors would be expected to affect the homogeneity and extent of single-phase alloy formation.

It is therefore the principal object of the present invention to provide a method for forming single-phase metal alloys of high surface area at low temperatures.

SUMMARY OF THE INVENTION

In accordance with the present invention, single-phase homogeneous metal alloys of high surface area are formed at low temperatures. In one embodiment, single-phase homogeneous metal alloys are formed by the $H_2$ reduction of a heteropolymetallic complex. In another embodiment, single-phase homogenous metal alloys are formed by thermolysis of a heteropolymetallic complex.

DETAILED DESCRIPTION OF THE INVENTION

In accordance with one embodiment of the present invention, a single-phase homogeneous Cu-Ni alloy is formed by the $H_2$ reduction of a heteropolymetallic complex.

For comparative purposes, three systems were chosen as precursors for Cu-Ni alloys via hydrogen reduction, and were compared regarding the extent of alloy formation, homogeneity and morphology of the reduced product. The systems chosen for study were a copper (II) nitrate/nickel(II) nitrate mixture (precursor 1), a copper(II) chloride/nickel (II) chloride mixture (precursor 2) and a heteropolymetallic complex of formula:

$$(\mu_4-O) N_4CVu_3NiCl_6 \cdot H_2O$$

(precursor 3) where N is N,N-diethylnicotinamide. Each of the precursor systems contained a 3:1 atomic ratio of copper to nickel. The heteropolymetallic complex was prepared by the transmetalation reaction:

$$(\mu_4-O)N_4Cu_4Cl_6 + Ni(NS)_2 \rightarrow (\mu_4-O)N_4Cu_3NiCl_6 + Cu(NS)_2$$

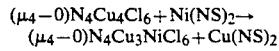

where NS is S-methyl isopropylidenehydrazinecarbodithioate. The Cu-Ni complex has the same core structure as the parent polynuclear copper complex, and is quite stable, with a shelf life of at least several months.

The reduction of the precursors was carried out in a Dupont Model 1090 thermogravimetric analysis (TGA) apparatus. The samples (25 mg aliquots) were heated in 85%:15% Ar:$H_2$ (flow rate 100 ml min$^{-1}$) to 650° C. at a rate of 60° C. h$^{-1}$. The change in weight as a function of temperature was recorded, and the temperature of complete reduction to metal was determined for each precursor. The extent of alloy formation in the reduction products was measured by X-ray diffraction. Patterns were obtained with a Philips diffractometer using monochromated high intensity Cu-K$\alpha_1$ radiation ($\lambda=0.15405$nm). Morphology and chemical homogeneity were determined with a JEOL JXA-40 scanning electron microscope (SEM) equipped with two JEOL wavelength dispersive spectrometers (WDS), a Tracor Northern energy dispersive spectrometer (EDS) and a Tracor Northern model 550/5600 X-ray and image analyser.

Temperatures required for the complete reduction of the precursors in hydrogen were determined by TGA, and are shown in the following Table 1.

TABLE 1

| PRECURSOR | DECOMPOSITION TEMPERATURE (°C.) |
|---|---|
| (Cu,Ni) nitrate | 248 |
| (Cu,Ni) chloride | 459 |
| Cu—Ni complex (precursor 3) | 370 |

The nitrates were completely reduced at the lowest temperature (248° C.), the chlorides at the highest temperature (459° C.), and the heteropolymetallic complex reduced at an intermediate temperature (370° C.). X-ray diffraction patterns of the reduction products were taken and observed.

The reduction of the nitrate precursor (precursor 1) produced pure copper and pure nickel metal with no indication of alloy formation seen in its X-ray diffraction pattern. This is consistent with the decomposition temperature of the nitrates (248° C.), which is below the critical temperature for alloy formation (320° C.) discussed earlier. Thus, alloy formation seems to be precluded with nitrate precursors under our experimental conditions. The X-ray diffraction results were consistent with X-ray compositional mapping data collected in the SEM with an EDS spectrometer. The X-ray dot maps indicated that copper was largely segregated from nickel.

The reduction of the metal chloride precursors (precursor 2) resulted in partial alloy formation according to the X-ray diffraction data. However, the appearance of shoulders on the diffraction peaks indicated that a single phase was not obtained. This is consistent with X-ray compositional data which clearly indicate compositional inhomogeneities. Partial alloy formation is consistent with the decomposition temperature of the chlorides (459° C.), which is above the critical temperature for alloy formation. The observed compositional inhomogeneities and incomplete phase formation seem to indicate that either additional processing steps or a different precursor system is required for the formation of single-phase alloys.

The reduction of the heteropolymetallic complex (precursor 3) resulted in single-phase alloy formation as seen in the related X-ray diffraction pattern. This is consistent with the decomposition temperature of the precursor (370° C.), which is above the critical temperature for alloy formation, and is also consistent with X-ray compositional mapping results, which indicate complete homogeneity of copper and nickel. Thus, it seems that homogeneity of copper and nickel on a molecular level in the heteropolymetallic precursor facilitates single-phase homogeneous alloy formation. Electron probe microanalysis (EPMA) gave a 3:1 ratio of Cu:Ni in the alloy, indicating that the stoichiometry of the precursor was preserved in the product. Furthermore, the alloy produced from the Cu-Ni complex showed significantly different morphology from that of the metal chloride (precursor 1) and metal nitrate (precursor 2) reduction products.

A SEM micrograph showed that the reduction of the heteropolymetallic complex (precursor 3) resulted in the formation of uniform, regular particles about 1 to 2 $\mu$m (micrometers) in size, whereas the nitrate and chloride precursors resulted in larger, more irregularly shaped particles ranging in size from 10 to 500 $\mu$m. This is of interest in catalysis where it is desirable to have a Cu-Ni alloy catalyst which is formed at low temperature (and therefore high surface area), single phase, homogeneous on a microscopic scale and of uniform particle size.

In accordance with a second embodiment of the present invention, single-phase, highly homogenous metal alloys are formed by thermolysis of heteropolymetallic complexes at low temperatures without use of an external reductant such as hydrogen.

Heating heteropolymetallic complexes having the formula:

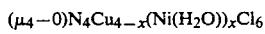

where N is N,N-diethylnicotinamide, and x is 1 (precursor 3), 2 (precursor 4), and 3 (precursor 5), respectively, at low temperatures in an inert atmosphere such as argon produces predominantly the single-phase alloys, $Cu_{0.75}Ni_{0.25}$, $Cu_{0.50}Ni_{0.50}$ and $Cu_{0.25}Ni_{0.75}$. Precursors 4 and 5 are homologues of precursor 3 and are obtained from the transmetalation reactions described earlier in reference to precursor 3.

In these experiments, thermolysis of precursors 3, 4, and 5 was monitored for 20 h at a series of fixed temperatures ranging from 150–450° C. in flowing Ar with a Cahn TGA-instrument. The resulting alloy products were characterized using X-ray analysis as described earlier.

A scanning electron micrograph of the $Cu_{0.50}Ni_{0.50}$ alloy resulting from the thermolysis of precursor 4 at 350° C. in flowing Ar at 1 atm for 20 h showed the product is primarily uniform particles about 1$\mu$m in diameter. X-ray dot compositional maps particle for copper and nickel in this product alloy showed that, like the products resulting from reduction of heteropolymetallic complexes by hydrogen, those produced by simple heating are also predominantly highly homogeneous single phase alloys.

A wide variety of heteropolymetallic complexes have been made by transmetalation. The reactions are quantitative under mild conditions, and the products are simple and easily separated. The methods disclosed herein suggest the use of such complexes as low-temperature precursors for facile alloy formation in a variety of metal systems.

It will now be apparent to those skilled in the art that other embodiments, improvements, details and uses can be made consistent with the letter and spirit of the foregoing disclosure and within the scope of the patent, which is limited only by the following claims, construed in accordance with patent law, including the doctrine of equivalents.

What is claimed is:

1. A method of making a substantially single-phase and homogeneous metal alloy of large surface area at low temperature, comprising the steps of
heating a heteropolymetallic complex (formed by transmetalation and) comprising copper and nickel, in an inert atmosphere, to a temperature which causes reductive decomposition of said heteropolymetallic complex; and
maintaining said temperature for a time sufficient to convert said heteropolymetallic complex into an alloy.

2. The method of claim 1 wherein said inert atmosphere is an argon atmosphere.

3. The method of claim 1 wherein the atomic ratio of copper to nickel in said heteropolymetallic complex is three to one.

4. The method of claim 1 wherein the atomic ratio of copper to nickel in said heteropolymetallic complex is one to one.

5. The method of claim 1 wherein the atomic ratio of copper to nickel in said heteropolymetallic complex is one to three.

6. The method of claim 1 wherein said heteropolymetallic complex has the chemical formula:

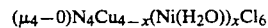

where N is N-diethylnicotinamide and x is 1, 2, or 3.

7. The method of claim 1 wherein said temperature ranges from about 150–450° C.

8. The method of claim 1 wherein said temperature ranges from about 250–450° C.

9. The method of claim 1 wherein said temperature is about 350° C.

* * * * *

UNITED STATES PATENT AND TRADEMARK OFFICE
CERTIFICATE OF CORRECTION

PATENT NO. : 5,061,313
DATED : October 29, 1991
INVENTOR(S) : Geoffrey Davies and Hui-Li Shao It is certified that error appears in the above-identified patent and that said Letters Patent is hereby corrected as shown below:

Column 2, line 9, "$(\mu_4\text{-O})N_4CV\mu_3$" should read --$(\mu_4\text{-O})N_4C\mu_3$--.

Column 4, line 9, "X-ray dot compositional maps particle for copper" should read --X-ray dot compositional maps for copper--.

Column 4, line 34-35, "heating a heteropolymetallic complex (formed by transmetalation and)" should read --heating a heteropolymetallic complex formed by transmetalation and--.

Signed and Sealed this

Twenty-first Day of September, 1993

Attest:

BRUCE LEHMAN

Attesting Officer

Commissioner of Patents and Trademarks